US006369022B2

(12) United States Patent
Hoogland et al.

(10) Patent No.: US 6,369,022 B2
(45) Date of Patent: Apr. 9, 2002

(54) FOAM CONTROL AGENTS

(75) Inventors: Jan Hoogland, Brussels (BE); George Sawicki, Vale of Glamorgan (GB)

(73) Assignees: Dow Corning, S.A.; Dow Corning Corporation

(*) Notice: Subject to any disclaimer, the term of this patent is extended or adjusted under 35 U.S.C. 154(b) by 0 days.

(21) Appl. No.: 09/756,251

(22) Filed: Jan. 8, 2001

(30) Foreign Application Priority Data

Jan. 14, 2000 (GB) .............................................. 0001021

(51) Int. Cl.$^7$ ............................ C11D 3/38; C11D 17/00
(52) U.S. Cl. ........................................ 510/466; 510/347
(58) Field of Search ................................ 510/466, 347

(56) References Cited

U.S. PATENT DOCUMENTS

| 3,329,625 | A |   | 7/1967  | Hoxie ........................ 252/358 |
| 4,072,621 | A |   | 2/1978  | Rose ........................... 252/89 |
| 4,082,689 | A | * | 4/1978  | Heyden et al. .............. 252/321 |
| 4,396,524 | A |   | 8/1983  | Hempel et al. ........ 252/174.15 |
| 4,501,681 | A | * | 2/1985  | Groult et al. ................ 252/174 |
| 4,824,593 | A |   | 4/1989  | Appel et al. ................. 252/127 |
| 5,055,229 | A |   | 10/1991 | Pelton et al. ................ 252/321 |
| 5,486,306 | A |   | 1/1996  | L'Hostis et al. ........ 525/174.15 |
| 5,668,095 | A |   | 9/1997  | Surutzidis et al. ........... 510/221 |
| 5,693,256 | A |   | 12/1997 | Sawicki et al. ............. 252/321 |
| 5,866,041 | A | * | 2/1999  | Svarz et al. ................. 252/358 |
| 5,908,891 | A |   | 6/1999  | Fey et al. .................... 524/491 |
| 5,968,889 | A |   | 10/1999 | Wierenga ................... 510/423 |

FOREIGN PATENT DOCUMENTS

| EP | 0 210 721 A2 | 2/1987 |
| EP | 0 217 501 B1 | 4/1987 |
| EP | 0 496 510 A1 | 7/1992 |
| EP | 0 663 225 A1 | 7/1995 |
| EP | 0 709 451 A1 | 5/1996 |

\* cited by examiner

Primary Examiner—Yogendra N. Gupta
Assistant Examiner—John M Petruncio
(74) Attorney, Agent, or Firm—Duane Morris LLP

(57) ABSTRACT

The foam control efficiency of a silicone antifoam in liquid or powder detergent formulations is improved by the use as an additive of an olefinically unsaturated alcohol, for example oleyl alcohol.

13 Claims, No Drawings

FOAM CONTROL AGENTS

FIELD OF THE INVENTION

This invention relates to a foam control agent for detergent compositions, particularly a foam control agent comprising a silicone antifoam.

BACKGROUND OF THE INVENTION

Detergent compositions used, for example in washing applications, contain surfactants which promote the production of foam during a washing process. The amount of foam produced when detergent compositions are agitated, as found during a washing process, can be excessive which can have detrimental effect upon the cleaning efficiency of the detergent composition. It is therefore desirable to control the amount of foam generated and generally foam control agents are added to the detergent composition for this purpose.

Silicone antifoams are known in the art, for example in U.S. Pat. No. 5,968,889 and EP 709451. U.S. Pat. No. 5,668,095 describes a suds suppressing system for detergent compositions which comprises a mixture of a silicone oil with a 2-alkyl alcanol. U.S. Pat. No. 4,806,266 describes a particulate foam control agent in finely divided form for inclusion in a detergent composition in powder form, the agent comprising 1 part by weight of a silicone antifoam and not less than 1 part by weight of an organic material which is a fatty acid or a fatty alcohol having a carbon chain containing from 12 to 20 carbon atoms and a melting point in the range 45 to 80° C. and being insoluble in water. U.S. Pat. No. 5,238,596 describes particulate foam control agents for powder detergents comprising silicone antifoam with at least 30% by weight water insoluble 12–20C fatty acid or fatty alcohol and melting point in the range 45–80° C. or a monoester of glycerol and a fatty acid having a melting point in the range 50–85° C., and a native starch carrier material. U.S. Pat. No. 4,824,593 describes an antifoam agent in the form of a polysiloxane in a fatty acid matrix.

U.S. Pat. No. 3,329,625 describes a defoaming cleaning cake, for use in a floor cleaning device, comprising a wax-like material of melting point 40–100° C., a polyalkylene oxide emulsifier and suspended particles of polydimethylsiloxane.

There is a trend in the detergents industry towards compositions containing more high foaming surfactants. There is therefore a need to provide an improved foam control agent suitable for use in detergent compositions which avoids the need for higher concentrations of silicone antifoams with the high foaming surfactants.

SUMMARY OF THE INVENTION

We have found according to the invention that the use of unsaturated alcohols in combination with silicone antifoams enhances the ability of silicone antifoams to control foam formation.

According to the invention there is provided a foam control agent comprising a silicone antifoam and an olefinically unsaturated alcohol.

DETAILED DESCRIPTION OF THE INVENTION

The silicone used in the foam control agent of the present invention is generally a liquid organopolysiloxane polymer and can be any of those suggested for use in silicone antifoams, for example as described in EP 578424. The polymers can be linear or branched having a structure according to the general formula (I).

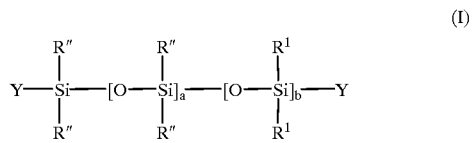

In formula (I), R" denotes a monovalent hydrocarbon group having from 1 to 35 carbon atoms, preferably 1 to 8 carbon atoms. The groups R" may be the same or different. R1 denotes a group R", a hydroxyl group or a group according to the general formula (II).

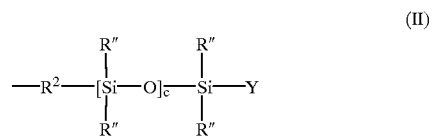

wherein R2 denotes a divalent hydrocarbon, hydrocarbonoxy, siloxane group or oxygen and Y denotes a group R" or a hydroxyl group, a, b and c have a value of 0 or an integer, provided at least one of a and b is an integer and the total of a+b+c has a value such that the viscosity of the organopolysiloxane polymer at 25° C. is at least 50 $mm^2/s$, preferably at least 500 $mm^2/s$. In the case where the organopolysiloxane polymers are linear, R1 denotes R" or a hydroxyl group. It is preferred for the linear organopolysiloxanes that Y denotes a group R" and that b=0.

Preferred polymers include those wherein at least 60 or even 80% of all R" groups denote an alkyl group having from 1 to 4 carbon atoms, most preferably methyl. The organopolysiloxane may be a trimethylsiloxy end-blocked polydimethylsiloxane, a polydiethylsiloxane or a methylphenylpolysiloxane, or may contain alkyl groups having 9 to 35 carbon atoms as described in U.S. Pat. No. 5,486,306. The organopolysiloxane can alternatively comprise an organopolysiloxane material having at least one silicon-bonded substituent of the formula X—Ph, wherein X denotes a divalent aliphatic organic group bonded to silicon through a carbon atom and Ph denotes an aromatic group as described in U.S. application Ser. No. 09/636,799, for example 2-phenylethyl or 2-phenylpropyl groups formed by reaction of styrene or alpha-methylstyrene with a Si—H group. The preferred viscosity of the organopolysiloxanes is from 500 to 100,000 $mm^2/s$ and more preferably 1000 to 60,000 $mm^2/s$ at 25° C.

Preferably the liquid organopolysiloxanes are branched or higher viscosity siloxanes (i.e. above 12,500 $mm^2/s$ at 25° C.). In the case where the organopolysiloxanes have branching in the siloxane chain, the polymers preferably have a structure according to Formula (I), wherein b has a value of at least 1 and R2 is preferably a divalent siloxane group or an oxygen atom. Preferred siloxane groups R2 can be formed by reaction of a siloxane resin with a polydiorganosiloxane polymer as described in U.S. Pat. No. 4,396,524. Branched siloxanes and methods of making them are described in a number of patent specifications, e.g. EP217501 and U.S. Pat. No. 5,055,229.

The silicone antifoam can additionally comprise a filler. Suitable fillers are described in many publications, for example U.S. Pat. No. 4,072,621. The fillers are generally finely divided particulate materials and include silica, fumed TiO2, Al2O3, zinc oxide, magnesium oxide, silicone resins, for example, alkylated silicone resins, salts of aliphatic carboxylic acids, reaction products of isocyanates with certain materials e.g. cyclohexylamine, alkyl amides, for example, ethylene or methylene bis stearamide.

The most preferred fillers are silica particles with a surface area of at least 50 m$^2$/g as measured by BET. Suitable silica particles may be made according to any of the standard manufacturing techniques, for example, thermal decomposition of a silicon halide, decomposition and precipitation of a metal salt of silicic acid, e.g. sodium silicate and a gel formation method. Suitable silicas for use in the silicone antifoams include fumed silica, precipitated silica and gel formation silica. The average particle size of the fillers preferably range from 0.1 to 20 micrometers, more preferably 0.25 to 10 micrometers and most preferably 0.5 to 5 micrometers.

Preferably the surface of the filler is rendered hydrophobic, and this can be effected by treatment of the filler particles with treating agents, e.g. reactive silanes or siloxanes, for example, dimethyldichlorosilane, trimethylchlorosilane, hexamethyldisilazane, hydroxyl end-blocked and methyl end-blocked polydimethylsiloxanes, siloxane resins, fatty acids or a mixture of one or more of these. Fillers which have already been treated with such compounds are commercially available from many companies, e.g. from Degussa. The surface of the filler may be rendered hydrophobic prior to the addition of the filler to the organopolysiloxane. Alternatively the filler surface may be rendered hydrophobic in situ, i.e. after the filler has been dispersed in the liquid organopolysiloxane component. This may be effected by adding to the liquid organopolysiloxane prior to, during or after the dispersion of the filler therein, the appropriate amount of treating agent of the kind described above either in the presence of a catalyst and/or heating the mixture to a temperature above 40° C. The filler is preferably present at 1 to 20 or 25% by weight of the antifoam, most preferably from 2 to 8%.

The silicone antifoam may additionally contain a siloxane resin, for example a resin consisting of monovalent trihydrocarbonsiloxy (M) groups of the formula R3SiO1/2 and tetrafunctional (Q) groups SiO4/2 wherein R denotes a monovalent hydrocarbon group as described in U.S. Pat. No. 5,693,256. The siloxane resin is preferably a solid resin and can be present as an insoluble filler or may be wholly or partially soluble in the liquid organopolysiloxane.

The olefinically unsaturated alcohol used in the foam control agent of the invention can in general be any unsaturated alcohol having a boiling point above 100° C. and is preferably a primary alcohol of the general formula R—OH where R represents an alkenyl group having from 10 to 22 carbon atoms. The olefinically unsaturated alcohol is most preferably oleyl alcohol (9-octadecen-1-ol) which is readily available and inexpensive. Palmitoleyl alcohol (9-hexadecen-1-ol), eicosen-1-ol and dodecenyl alcohol (a mixture of unsaturated C12–14 alcohols) are also available commercially and are suitable for use in the foam control agent of the invention.

The ratio of unsaturated alcohol to silicone antifoam to be employed in the foam control agent of the invention will depend on a number of factors, for example, on the nature of the silicone antifoam and on the amount of foam control required. The weight ratio of unsaturated alcohol to silicone antifoam is generally in the range of from 2500:1 to 0.05:1, preferably from 500:1 to 0.5:1 and most preferably from 100:1 to 5:1.

A foam control agent according to the invention using a combination of silicone antifoam and olefinically unsaturated alcohol gives enhanced foam control performance compared with the foam control performance of the individual components of the agent. The use of a foam control agent according to the invention can therefore enable the reduction of the level of silicone antifoam required to achieve a required level of foam reduction. For example the incorporation of oleyl alcohol at 1.0% by weight of a detergent composition can enable a fivefold reduction in the amount of the more expensive silicone antifoam material required to achieve foam control.

The foam control agent of the invention can be used in various detergent compositions such as detergent powder formulations used for machine washing and in liquid detergent compositions, for example concentrated liquid detergent compositions and aqueous or non-aqueous liquid detergent compositions.

The foam control agent of the invention may be a simple mixture of the above ingredients or they can be incorporated in alternative ways. They can for example be in the form of an emulsion, preferably an oil in water emulsion, or in particulate form, for example particles comprising the silicone and the unsaturated alcohol on a particulate support.

Emulsions may be made according to any of the known techniques, and may be macro-emulsions or micro-emulsions. In general, they comprise the foam control agent as the oil phase, one or more surfactants, water and standard additives, such as preservatives, viscosity modifiers, protective colloids and/or thickeners. The surfactants may be selected from anionic, cationic, nonionic or amphoteric materials. Mixtures of one or more of these may also be used. Suitable anionic organic surfactants include alkali metal soaps of higher fatty acids, alkyl aryl sulphonates, for example sodium dodecyl benzene sulphonate, long chain (fatty) alcohol sulphates, olefin sulphates and sulphonates, sulphated monoglycerides, sulphated esters, sulphonated ethoxylated alcohols, sulphosuccinates, alkane sulphonates, phosphate esters, alkyl isethionates, alkyl taurates and/or alkyl sarcosinates. Suitable cationic organic surfactants include alkylamine salts, quaternary ammonium salts, sulphonium salts and phosphonium salts. Suitable nonionic surfactants include silicones, particularly siloxane polyoxyalkylene copolymers, condensates of ethylene oxide with a long chain (fatty) alcohol or (fatty) acid, for example $C_{14-15}$ alcohol, condensed with 7 moles of ethylene oxide (Dobanol® 45–7), condensates of ethylene oxide with an amine or an amide, condensation products of ethylene and propylene oxides, esters of glycerol, sucrose or sorbitol, fatty acid alkylol amides, sucrose esters, fluoro-surfactants and fatty amine oxides. Suitable amphoteric organic detergent surfactants include imidazoline compounds, alkylaminoacid salts and betaines. It is more preferred that the organic surfactants are nonionic or anionic materials. Of particular interest are surfactants which are environmentally acceptable. The concentration of foam control agent in an emulsion may vary according to applications, required viscosity, effectiveness of the foam control agent and addition system, and ranges on average from 5 to 80% by weight, preferably 10 to 40%. A foam control emulsion may also contain a stabilising agent such as a silicone glycol copolymer or a crosslinked organopolysiloxane polymer having at least one polyoxyalkylene group, as described in EP663225.

Alternatively the foam control agent can be provided as a water-dispersible composition in which the silicone antifoam is dispersed in a water-dispersible carrier such as a silicone glycol or in another water-miscible liquid such as ethylene glycol, propylene glycol, polypropylene glycol, polyethylene glycol, a copolymer of ethylene and propylene glycols, a condensate of a polyalkylene glycol with a polyol, an alkyl polyglycoside, an alcohol alkoxylate or an alkylphenol alkoxylate or in a mineral oil as described in U.S. Pat. No. 5,908,891.

A particulate foam control agent can be a free flowing powder which is particularly suitable for incorporation in a detergent powder formulation. An appropriate particulate support can comprise any suitable solid material but conveniently may be an ingredient or component part of a detergent composition. As well as providing the foam control agent in a suitable physical form, the carrier bulks up the supported foam control agent to facilitate the dispersability of the supported foam control agent in powdered detergent. Even distribution of the supported foam control agent in the detergent composition is important since it is desirable that every unit-measure of the detergent composition used contains sufficient foam control agent to stop excessive foam formation even though the foam control agent may be employed at levels below 1% by weight of the total detergent composition. Preferably the carrier is a water soluble powder which facilitates dispersion of the foam control agent in aqueous liquor during the wash cycle. It is most suitable to choose support particles or granules which themselves play an active role in the laundering or washing process. Examples of such materials are sodium sulphate, sodium carbonate, sodium citrate, sodium tripolyphosphate and clay minerals. Such materials are useful as for example, builders, soil suspenders, diluents and/or softeners in the detergent composition.

The support may be a solid on which the foam control agent is deposited during manufacture. Alternatively the support particles can be combined with premixed foam control agent. Particulate foam control agents can alternatively be formed by granulation, spray drying, emulsification followed by drying or extrusion and comminution.

The components of the foam control agent are preferably combined prior to addition to the detergent composition as described above, but alternatively the individual components of the agent can be added directly to the detergent composition. The components of both the detergent and foam control agent may be mixed together during the manufacture of the detergent composition without the need of pre-mixing of either the detergent or foam control agent.

Thus according to another aspect of the invention a detergent composition containing a silicone foam control agent is characterised in that the composition additionally contains an olefinically unsaturated alcohol.

The detergent composition generally comprises at least one surfactant of the anionic, cationic, non-ionic or amphoteric type or mixtures thereof, at least one organic and/or inorganic builder salt and optionally other additives and diluents.

Suitable anionic organic detergent surfactants include alkali metal soaps of higher fatty acids, alkyl aryl sulphonates, for example sodium dodecyl benzene sulphonate, long chain (fatty) alcohol sulphates, olefin sulphates and sulphonates, sulphated monoglycerides, sulphated esters, sulphosuccinates, alkane sulphonates, phosphate esters, alkyl isoethionates, sucrose esters and fluorosurfactants.

Suitable cationic organic detergent surfactants include alkylamine salts, quaternary ammonium salts, sulphonium salts and phosphonium salts.

Suitable non-ionic organic detergent surfactants include condensates of ethylene oxide with a long chain (fatty) alcohol or (fatty) acid, for example C14–15 alcohol condensed with 7 moles of ethylene oxide (Dobanol® 45–7), condensates of ethylene oxide with an amine or an amide, condensation products of ethylene and propylene oxides, fatty acid alkylol amide and fatty amine oxides. Suitable amphoteric organic detergent surfactants include imidazoline compounds, alkylaminoacid salts and betaines.

It is more preferred that the organic surfactants are nonionic or anionic materials, for example alkyl sulphates, alkyl aryl sulphonates, alkyl sulphonates, primary alkyl ethoxylates and alkylpolyglucosides or derivatives thereof.

Examples of suitable building agents for use in the detergent compositions are phosphates, polyphosphates, pyrophosphates, orthophosphates, phosphonates, carboxylates, polycarboxylates, succinates, silicates, carbonates and sulphates. Other components which can be included in a detergent composition of the invention include oxygen releasing compounds such as perborates, persulphates, persilicates, perphosphates, percarbonates and other bleaching agents and alumino-silicates, for example, zeolites. Examples of organic components are anti-redeposition agents such as carboxymethylcellulose, brighteners, chelating agents such as ethylene diamine tetraacetic acid and nitrilotriacetic acid, enzymes and bacteriostats. Other optional components include materials commonly found in laundry and cleaning compositions such as colorants, dyes, perfumes, corrosion inhibitors, soil suspending agents, anti-caking agents, softeners, clays, some of which may be encapsulated.

The amount of foam control agent to be used in a detergent composition according to the invention will depend on such factors as the required amount of foam control, the type of detergent and the end-use application of the detergent composition. Preferably a detergent composition according to the present invention comprises from 0.005 to 2% by weight of the silicone antifoam material, more preferably from 0.01 to 0.5% and most preferably from 0.02 to 0.2% of the silicone antifoam material, with the ratio of unsaturated alcohol to silicone antifoam being as described above.

The following examples are provided to illustrate the invention. All parts and percentages are given by weight unless otherwise indicated.

EXAMPLE 1

An encapsulated foam control agent was produced comprising 11.5% of a branched liquid siloxane antifoam as described in EP217501 and "TS720" hydrophobic silica (5% based on liquid siloxane) mixed with 17% of an ethoxylated fatty alcohol based binder and sprayed on 71.5% starch.

0.35 g of the encapsulated foam control agent and 1.00 g oleyl alcohol were added to 78.5 g detergent powder used to wash 16 towels (3.2 kg load) in 14 litres water in a "Miele W934" (Trade Mark) front loading washing machine.

Wash tests were carried out at 40° C. and 95° C. The height of foam was observed every 5 minutes throughout each wash test and during each of 3 rinse cycles; 0=no foam, 50=half window of foam, 100=full window of foam, 120= overflow from washing machine.

In a comparative example C1, 1.75 g of the encapsulated foam control agent was added to the detergent without any oleyl alcohol and was tested similarly.

Further comparative tests were carried out at a different date using the foam control agents of Example 1 (0.35 g encapsulated antifoam plus 1.0 g oleyl alcohol, shown in Table 1 as 1A) and of comparative example C1 (1.75 g encapsulated antifoam, shown as C1A) and further comparative examples in which the oleyl alcohol of Example 1 was replaced by 1-hexadecanol (C2) or octadecanol (C3). These tests used a shorter wash cycle at 40° C. than at 95° C. The results of all the above tests are shown in Table 1.

TABLE 1

| Example | C1 | | 1 | | C1A | | 1A | | C2 | | C3 | |
|---|---|---|---|---|---|---|---|---|---|---|---|---|
| Temp °C. | 40 | 95 | 40 | 95 | 40 | 95 | 40 | 95 | 40 | 95 | 40 | 95 |
| 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 60 | 50 | 50 | 40 |
| 10 | 0 | 0 | 0 | 10 | 0 | 0 | 0 | 0 | 80 | 80 | 80 | 80 |
| 15 | 20 | 20 | 60 | 50 | 50 | 60 | 10 | 10 | 100 | 100 | 100 | 100 |
| 20 | 60 | 50 | 100 | 100 | 70 | 100 | 10 | 50 | 100 | 100 | 100 | 100 |
| 25 | 70 | 80 | 100 | 100 | 90 | 100 | 40 | 60 | 100 | 100 | 100 | 100 |
| 30 | 90 | 100 | 100 | 100 | 100 | 100 | 60 | 100 | 100 | 100 | 100 | 100 |
| 35 | 100 | 100 | 100 | 100 | 100 | 100 | 70 | 100 | 100 | 120 | 100 | 100 |
| 40 | 100 | 100 | 100 | 100 | 100 | 100 | 80 | 100 | 100 | 120 | 100 | 100 |
| 45 | 100 | 100 | 100 | 100 | 100 | 100 | 80 | 100 | 100 | 100 | 100 | 100 |
| 50 | 100 | 100 | 100 | 100 |  | 100 |  | 100 |  | 100 | 100 | 100 |
| 55 | 100 | 100 | 100 | 100 | 100 | 100 |  |  |  | 100 |  | 100 |
| Sum | 740 | 750 | 860 | 860 | 610 | 860 | 300 | 720 | 840 | 1070 | 830 | 1020 |
| R1 (1h09) | 50 | 40 | 60 | 40 | 60 | 90 | 25 | 30 | 80 | 60 | 100 | 80 |
| R2 (1h20) | 30 | 30 | 40 | 20 | 25 | 40 | 15 | 15 | 50 | 15 | 80 | 40 |
| R3 (1h30) | 10 | 0 | 10 | 0 | 20 | 15 | 10 | 0 | 35 | 15 | 60 | 20 |

It can be seen from Table 1 that the use of oleyl alcohol at a level of 1 or 2% based on the detergent powder allows the amount of siloxane foam control agent to be reduced by 80% while maintaining a similar or improved level of foam control. Improved foam control is shown particularly in the rinse cycle. Saturated alcohols such as hexadecanol or octadecanol do not show this effect.

EXAMPLES 2 to 4

The procedure of Example 1 was repeated varying the proportion of hydrophobic silica in the siloxane antifoam and the amount of oleyl alcohol added as shown below

|  | Hydrophobic silica % based on siloxane | Weight of oleyl alcohol |
|---|---|---|
| Example 2 | 2.5% "TS530" | 1.17 g |
| Example 3 | 2.5% "TS530" | 2.00 g |
| Example 4 | 2.5% "TS530" and 2.5% "Sipernat D10" | 1.00 g |

The antifoams of Examples 2 to 4 were tested in wash tests as described in Example 1. The results are shown in Table 2 below.

TABLE 2

| Example | 2 | | 3 | | 4 | |
|---|---|---|---|---|---|---|
| Temp °C. | 40 | 95 | 40 | 95 | 40 | 95 |
| 0 | 0 | 0 | 0 | 0 | 0 | 0 |
| 5 | 0 | 0 | 0 | 0 | 0 | 0 |
| 10 | 0 | 0 | 0 | 0 | 0 | 0 |
| 15 | 0 | 50 | 0 | 0 | 50 | 0 |
| 20 | 0 | 80 | 0 | 0 | 100 | 40 |
| 25 | 60 | 100 | 0 | 0 | 100 | 60 |
| 30 | 80 | 100 | 0 | 10 | 100 | 80 |
| 35 | 100 | 100 | 40 | 30 | 100 | 100 |
| 40 | 100 | 100 | 60 | 60 | 100 | 100 |
| 45 | 100 | 100 | 100 | 100 | 100 | 100 |
| 50 | 100 | 100 | 100 | 100 | 100 | 100 |
| 55 | 100 | 100 | 100 | 100 | 100 | 100 |
| Sum | 640 | 830 | 400 | 400 | 850 | 680 |
| R1 (1h09) | 60 | 50 | 40 | 50 | 60 | 40 |
| R2 (1h20) | 30 | 10 | 10 | 20 | 40 | 20 |
| R3 (1h30) | 10 | 0 | 0 | 0 | 20 | 0 |

EXAMPLE 5

A siloxane foam control agent was prepared by blending 92% of a methyl ethyl, methyl 2-phenylpropyl siloxane fluid (as described in Example 1 of U.S. application Ser. No. 09/636,799) with 4% of a silicone resin of M/Q ratio 0.65:1 and 4% hydrophobic silica. 12.3% of this siloxane foam control agent was mixed with 17% binder and 70.7% zeolite to produce an encapsulated foam control agent.

0.67 g of the encapsulated foam control agent and 1.00 g oleyl alcohol were added to 83.5 g detergent powder and wash test at 40° C. was carried out as described above. A comparative example C5 was carried out using 0.67 g of the encapsulated foam control agent alone.

EXAMPLES 6 and 7

0.35 g of the encapsulated foam control agent described in Example 5 and 2.0 g oleyl alcohol (Example 6) or 1.0 g oleyl alcohol (Example 7) were added to a detergent composition. A comparative experiment C5A was carried out using 0.69 g of the encapsulated foam control agent of Example 5 alone. Further comparative experiments were carried out using the formulation of Example 6 with the oleyl alcohol replaced by 1-hexadecanol (C6) or octadecanol (C7). The wash test results are shown in Table 3 below

TABLE 3

| Example | 5 | C5 | 6 | | 7 | | C5A | | C6 | | C7 | |
|---|---|---|---|---|---|---|---|---|---|---|---|---|
| Temp °C. | 40 | 40 | 40 | 95 | 40 | 95 | 40 | 95 | 40 | 95 | 40 | 95 |
| 0 | 0 | 0 | 0 | 0 | 0 | 0 | 0 | 0 | 0 | 0 | 0 | 0 |
| 5 | 0 | 10 | 0 | 0 | 0 | 0 | 0 | 10 | 10 | 20 | 10 | 40 |
| 10 | 0 | 50 | 0 | 0 | 10 | 10 | 10 | 40 | 70 | 70 | 60 | 50 |
| 15 | 40 | 70 | 0 | 10 | 30 | 30 | 30 | 40 | 70 | 70 | 60 | 50 |
| 20 | 50 | 70 | 10 | 20 | 50 | 40 | 50 | 40 | 80 | 70 | 70 | 50 |
| 25 | 50 | 60 | 10 | 30 | 50 | 40 | 60 | 30 | 90 | 80 | 70 | 20 |
| 30 | 50 | 50 | 20 | 40 | 60 | 50 | 70 | 20 | 100 | 50 | 80 | 20 |
| 35 | 50 | 40 | 30 | 30 | 80 | 50 | 70 | 20 | 100 | 50 | 80 | 20 |
| 40 | 50 | 40 | 50 | 40 | 80 | 50 | 70 | 20 | 100 | 50 | 80 | 20 |
| 45 | 60 | 50 | 60 | 50 | 80 | 50 | 70 | 30 | 100 | 70 | 80 | 30 |
| 50 | 70 | 60 | | 60 | | 60 | | 30 | | 80 | | 40 |
| 55 | 80 | 70 | | 90 | | 80 | | 40 | | 100 | | 50 |
| Sum | 500 | 570 | 180 | 370 | 440 | 460 | 430 | 320 | 720 | 710 | 590 | 390 |
| R1 (1h09) | 50 | 50 | 0 | 20 | 30 | 35 | 40 | 50 | 70 | 40 | 45 | 20 |
| R2 (1h20) | 40 | 30 | 0 | 20 | 20 | 25 | 40 | 30 | 70 | 40 | 30 | 10 |
| R3 (1h30) | 30 | 30 | 0 | 5 | 20 | 15 | 40 | 20 | 50 | 30 | 30 | 5 |

It can be seen from Table 3 that the use of oleyl alcohol at a level of 1 or 2% based on the detergent powder allows the amount of the siloxane foam control agent described in Example 5 to be halved while maintaining a similar or improved level of foam control.

That which is claimed is:

1. A foam control agent for addition to a detergent composition comprising
    (a) a silicone antifoam selected from the group consisting of
        (i) branched liquid organopolysiloxanes;
        (ii) liquid organopolysiloxanes having a viscosity of above 12,500 mm$^2$/s at 25° C.;
        (iii) liquid polyorganosiloxanes which contain alkyl groups having 9 to 35 carbon atoms; and
        (iv) liquid polyorganosiloxanes having at least one silicon-bonded substituent of the formula X—Ph, wherein X denotes a divalent aliphatic organic group bonded to silicon through a carbon atom and Ph denotes an aromatic group; and
    (b) an olefinically unsaturated alcohol.

2. A foam control agent according to claim 1 wherein the olefinically unsaturated alcohol has the formula R—OH where R denotes an alkenyl group having 10 to 22 carbon atoms.

3. A foam control agent according to claim 2 wherein the olefinically unsaturated alcohol is oleyl alcohol.

4. A foam control agent according to claim 1 wherein the liquid polyorganosiloxane is a branched polydimethylsiloxane.

5. A foam control agent according to claim 1 wherein the silicone antifoam comprises an organopolysiloxane material having at least one silicon-bonded substituent of the formula X—Ph, wherein X denotes a divalent aliphatic organic group bonded to silicon through a carbon atom present in X and Ph denotes an aromatic group.

6. A foam control agent according to claim 1 wherein the silicone antifoam contains a branched siloxane resin.

7. A foam control agent according to claim 1 wherein the silicone antifoam contains a hydrophobic filler.

8. A foam control agent according to claim 1 wherein the weight ratio of olefinically unsaturated alcohol to silicone antifoam is from 100:1 to 5:1.

9. A foam control agent according to claim 1 which is in the form of an oil-in-water emulsion.

10. A foam control agent according to claim 1 which is in the form of particles, said particles comprising the silicone and the unsaturated alcohol on a support.

11. A detergent composition comprising at least one active detergent selected from anionic, cationic, nonionic and amphoteric surfactants, wherein the composition contains a foam control agent according to claim 1.

12. A detergent composition according to claim 11 which is in the form of a detergent powder formulation, wherein the composition contains a foam control agent in the form of particles according to claim 8.

13. A detergent composition comprising at least one active detergent selected from anionic, cationic, nonionic and amphoteric surfactants, wherein the composition contains
    (a) a silicone foam control agent selected from the group consisting of
        (i) branched liquid organopolysiloxanes;
        (ii) liquid organopolysiloxanes having a viscosity of above 12,500 mm$^2$/s at 25° C.;
        (iii) liquid polyorganosiloxanes which contain alkyl groups having 9 to 35 carbon atoms; and
        (iv) liquid polyorganosiloxanes having at least one silicon-bonded substituent of the formula X—Ph, wherein X denotes a divalent aliphatic organic group bonded to silicon through a carbon atom and Ph denotes an aromatic group; and
    (b) an olefinically unsaturated alcohol.

* * * * *